Dec. 21, 1937.  C. W. SINCLAIR  2,102,811
VEHICLE WHEEL
Filed May 13, 1935   3 Sheets-Sheet 1
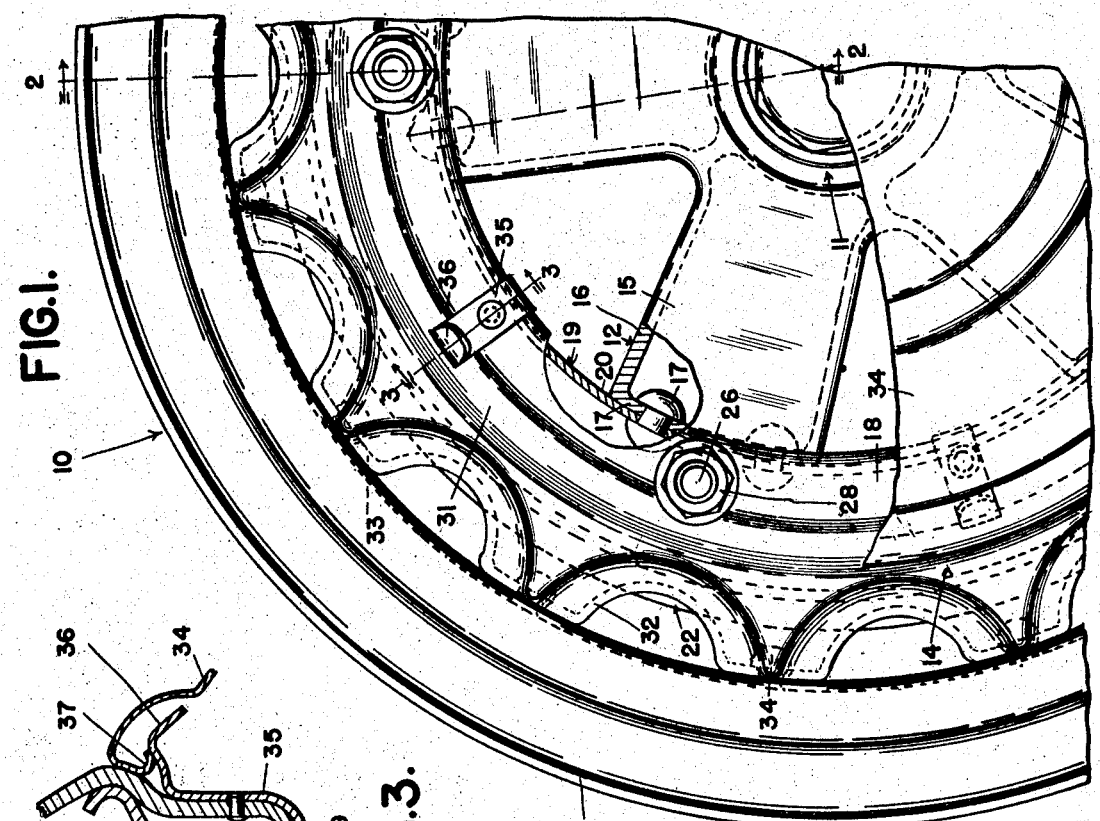
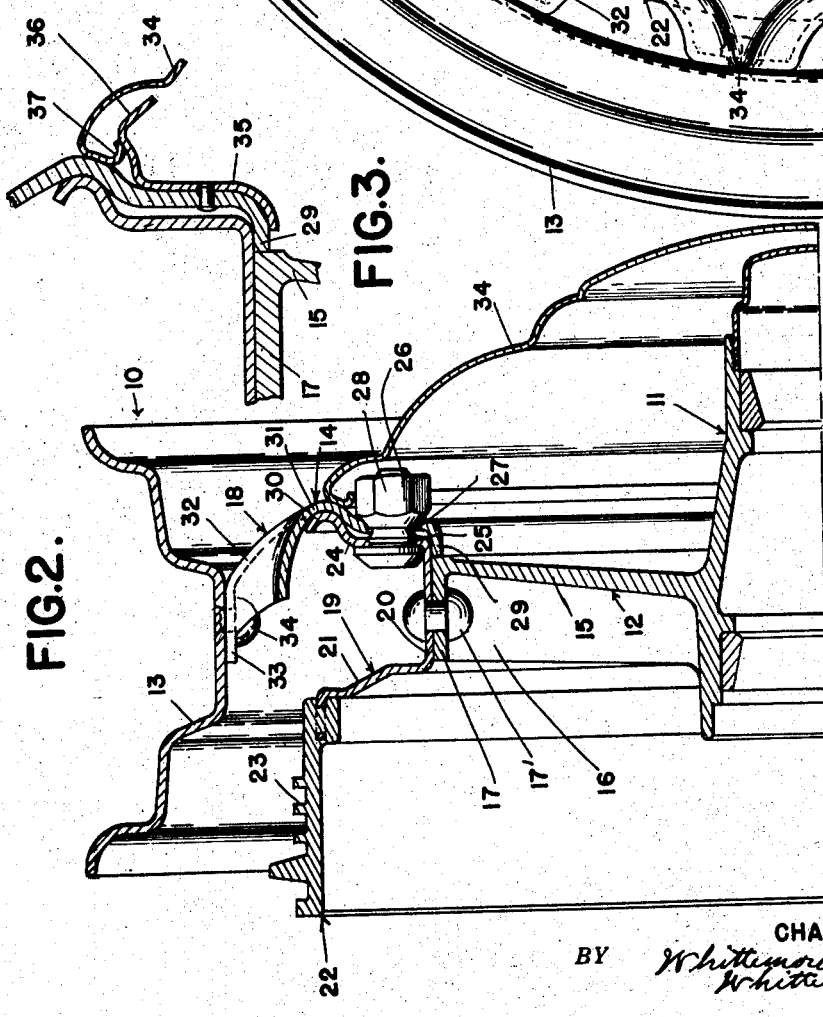
INVENTOR
CHARLES W. SINCLAIR
BY Whittemore Hulbert
   Whittemore & Belknap
ATTORNEYS Dec. 21, 1937.  C. W. SINCLAIR  2,102,811
VEHICLE WHEEL
Filed May 13, 1935   3 Sheets-Sheet 2
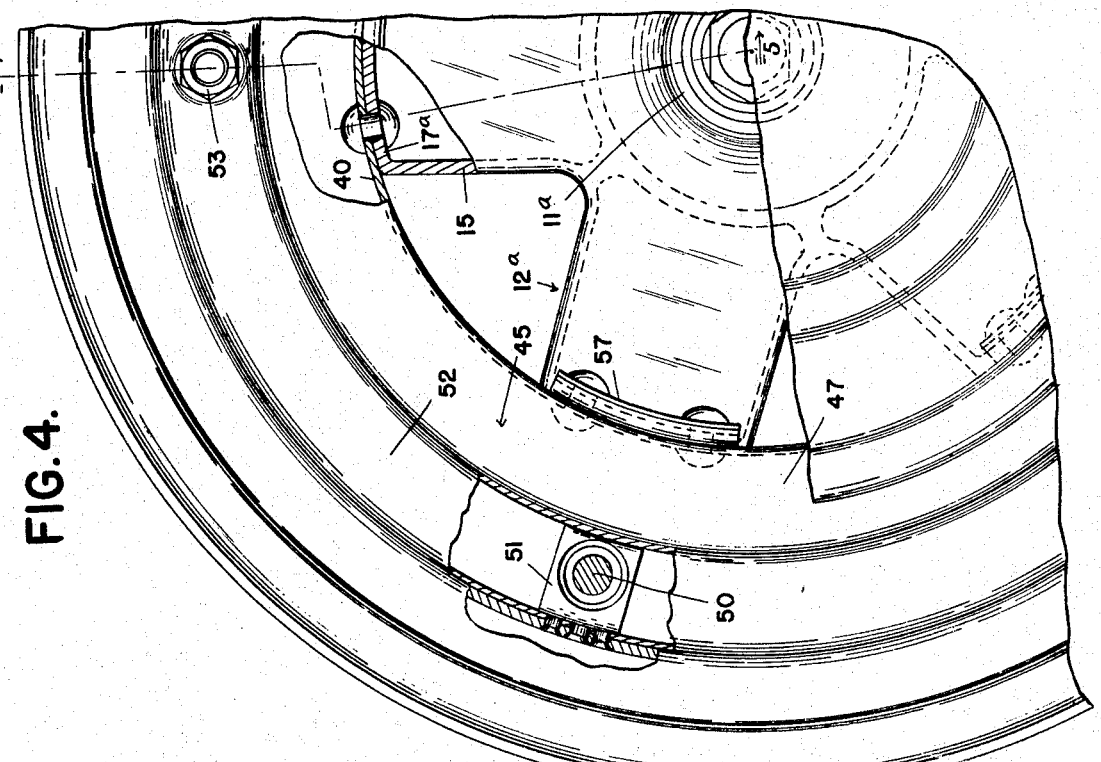
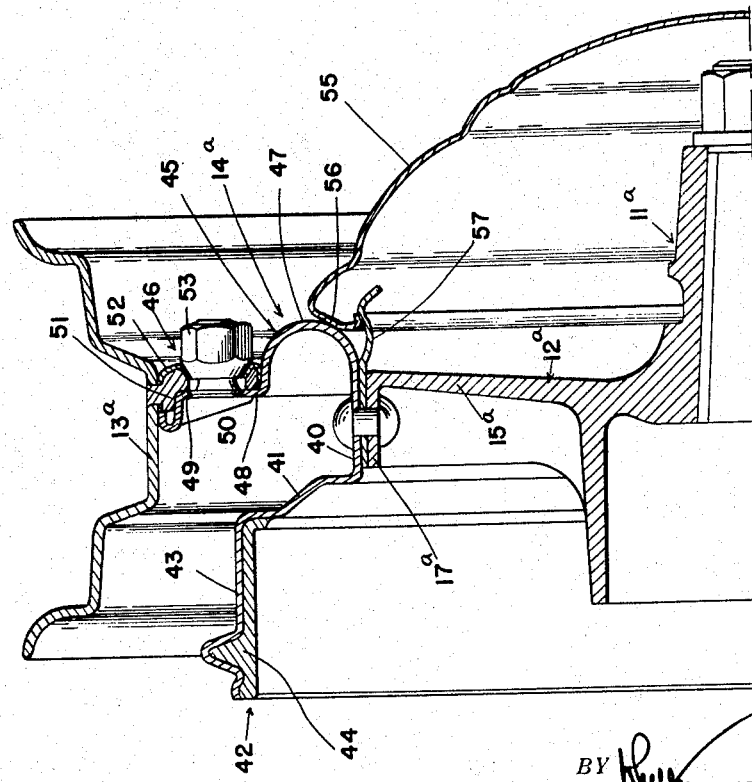
*INVENTOR*
CHARLES W. SINCLAIR
BY
*ATTORNEYS*

Dec. 21, 1937.  C. W. SINCLAIR  2,102,811
VEHICLE WHEEL
Filed May 13, 1935  3 Sheets-Sheet 3
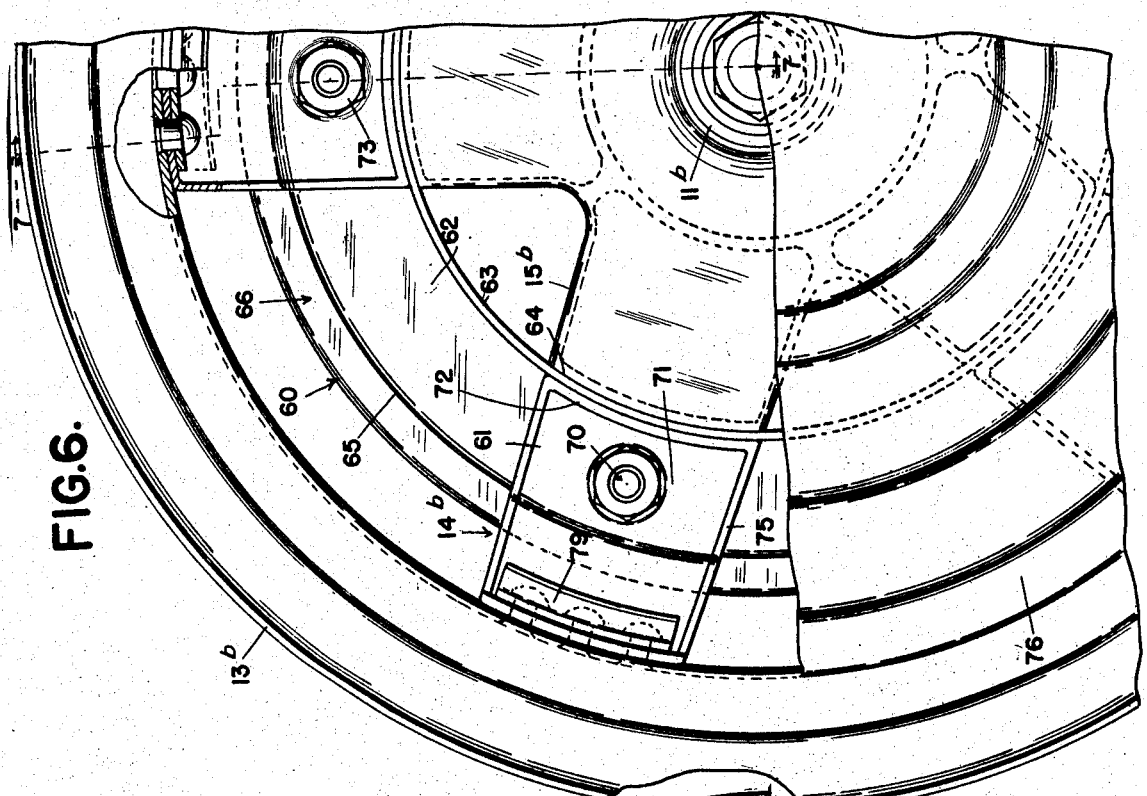
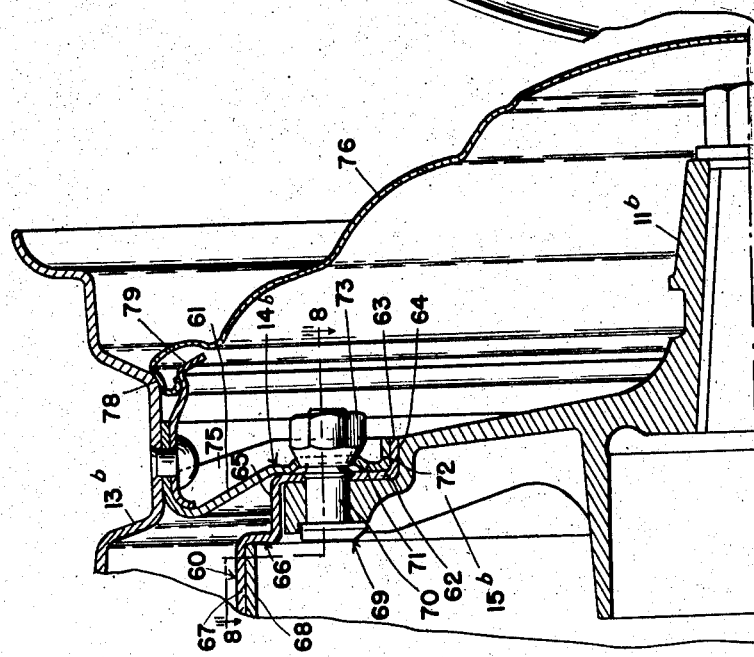
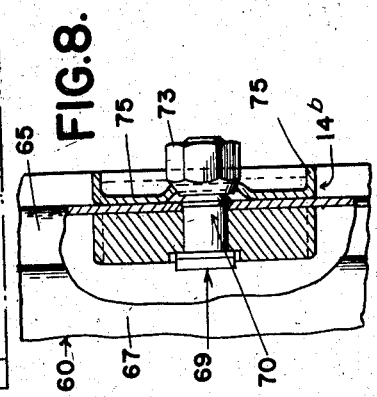
INVENTOR
CHARLES W. SINCLAIR
BY
ATTORNEYS Patented Dec. 21, 1937

2,102,811

UNITED STATES PATENT OFFICE 2,102,811

VEHICLE WHEEL

Charles W. Sinclair, Detroit, Mich., assignor to Kelsey-Hayes Wheel Company, Detroit, Mich., a corporation of Delaware Application May 13, 1935, Serial No. 21,241

5 Claims. (Cl. 301—6)

This invention relates generally to vehicle wheels, and refers more particularly to motor vehicle wheels of the type equipped with brake drums.

One of the principal objects of this invention is to improve generally vehicle wheels of the character set forth, by providing a construction offering the possibility of appreciably reducing the weight of the wheel assembly without sacrificing the strength required for durability, and at the same time rendering it possible to materially increase the braking efficiency of the brake mechanism associated with the brake flange of the drum forming a part of the vehicle wheel.

Another important object of this invention which contributes to securing the foregoing advantageous features resides in the provision of a vehicle wheel having a brake drum forming a unit with a portion of the wheel body and having means for securing the unit to a load carrying member of the wheel in such a manner that the stresses or reactions resulting from the application of axial loads on the rim of the wheel are transmitted, through the securing means, to the load carrying member, instead of to the brake drum, with the result that the liability of the brake drum becoming distorted during operation of the wheel is materially minimized.

Another advantageous feature of the present invention resides in the provision of a vehicle wheel embodying an annular substantially channel-shaped member incorporated in the assembly with the flanges thereof extending outwardly from the base in axial spaced relationship to form respectively a wheel body element and a brake drum element, and having the base permanently secured to the load carrying member between the flanges, in such a manner that the axial stresses applied to the rim of the wheel are transmitted to the load carrying member through the wheel body element and securing means aforesaid.

A further object of this invention resides in the provision of a vehicle wheel of the type embodying a unitary brake drum and wheel body, wherein the wheel body is flexible, to a certain extent, so as to provide a limited relative axial displacement between the rim of the wheel and brake drum of the latter.

The foregoing, as well as other objects, will be made more apparent as this description proceeds, especially when considered in connection with the accompanying drawings, wherein:

Figure 1 is a fragmentary front elevational view of a vehicle wheel constructed in accordance with this invention and having certain parts broken away for the sake of clearness;

Figure 2 is a cross-sectional view taken substantially on the plane indicated by the line 2—2 of Figure 1;

Figure 3 is a fragmentary sectional view taken substantially on the plane indicated by the line 3—3 of Figure 1;

Figure 4 is a fragmentary front elevational view of a slightly modified form of vehicle wheel having certain parts broken away for the sake of clearness;

Figure 5 is a cross-sectional view taken substantially on the plane indicated by the line 5—5 of Figure 4;

Figure 6 is a fragmentary front elevational view of still another embodiment of this invention and having certain parts broken away for the sake of clearness;

Figure 7 is a cross-sectional view taken substantially on the plane indicated by the line 7—7 of Figure 6; and Figure 8 is a cross-sectional view taken substantially on the plane indicated by the line 8—8 of Figure 7.

Referring now more in detail to the embodiment of the invention illustrated in Figures 1 to 3 inclusive, it will be noted that the reference character 10 designates a vehicle wheel having a hub 11 provided with a radially outwardly extending load carrying portion 12 and having a tire carrying rim 13 supported upon the load carrying portion, by means of a member 14. The load supporting portion 12 of the hub 11 comprises a plurality of spokes 15 having rearwardly extending flanges at opposite edges thereof and having axially rearwardly extending portions 17 at the outer ends thereof forming seats for the wheel body member 14. The ability of the spokes 15 to effectively support the wheel loads will be apparent upon consideration of Figure 2, wherein the flanges 16 are shown as having the inner ends integrally connected with the barrel portion of the hub, and as having the outer ends co-extensive with the axially extending seats 17 and integrally connected thereto.

In the present instance, the member 14 comprises two sections designated generally in Figure 2, by the reference characters 18 and 19. The section 19 of the member 14 is substantially channel-shaped in cross-section and encircles the outer ends of the spokes 15 with the annular base portion 20 permanently secured in engaging relation to the seats 17 by rivets 17', and with the flanges extending outwardly from the base portion. The rear flange 21 cooperates with the load supporting portion 12 to form the web of a brake drum 22 and the peripheral portion of the flange 21 is preferably, although not necessarily, cast integral with the brake flange 23 of the drum. The front flange 24 of the section 19 forms a wheel body element and is demountably secured to the section 18, which cooperates with the flange 24 in forming the wheel body. As shown in Figure 2, the flange 24 is apertured at circumferentially spaced points as indicated by the reference character 25, and a bolt 26 is permanently secured in each of the apertures, in such a manner that the threaded shank portions thereof project forwardly beyond the flange 24 through aligned openings 27 formed in the portion of the section 18 positioned opposite the flange 24. As will also be observed from Figure 2, the apertured portion of the section 18 at the front side of the flange 24 is spaced a sufficient distance axially from the flange to permit tensioning the same by the fastener nuts 28, and thereby prevent accidental disengagement of the nuts 28 from the bolts 26. In detail, the inner edge of the wheel body section 18 is provided with a rearwardly extending flange 29 engageable with the front sides of the spokes 15 adjacent the outer ends of the latter and having a length predetermined to provide spacing the apertured portion of the section 18 the desired distance from the flange 24 on the section 19. The periphery of the flange 24 on the section 19 cooperates with the flange 29 on the section 18 to secure the space previously referred to and, in the present instance, the peripheral portion of the flange 24 is fashioned to form an annular bead 30 substantially semi-circular in cross-section. By reference to Figure 2, it will be noted that the bead is spaced axially forwardly from the apertured portion of the flange 24 and forms a seat for a correspondingly shaped portion 31 on the section 18. Thus, it will be apparent that when the nuts 28 are tightened upon the bolts 26, the portions of the section 18 between the bead and flange 29 are flexed rearwardly, or in other words, are tensioned to such an extent that the nuts are locked against accidental rotation relative to the bolts.

In the embodiment of the invention shown in Figures 1 to 3 inclusive, the portion of the front section 18 of the wheel body radially outwardly beyond the fastener elements, is curved rearwardly and is preferably, although not necessarily, fashioned to form V-shaped spokes 32. The outer ends of the spokes are provided with circumferentially spaced axially extending seats 33 for engaging the inner surface of the base portion of the rim and are permanently secured to the base portion by rivets 34.

It is to be understood that the member 14 is formed from sheet metal and that the contour of the section 18 is determined to provide a limited degree of flexibility of the section 18 in response to axial loads applied to the rim 13. The flexibility of the section 18, together with the fact that the member is secured to the spokes 15 intermediate the brake drum and wheel body portions, permits a limited axial displacement of the tire carrying rim 13 relative to the brake drum 22, with the result that the wheel body portion absorbs, to a certain extent, the stresses resulting from axial loads applied to the rim. In any event, the axial loads applied to the tire carrying rim 13 are prevented from distorting the brake drum 22, because any reaction resulting from such loads is transmitted through the rivets 17' to the load carrying portion or spokes 15, which are predeterminedly designed to effectively take this reaction.

It will, of course, be understood from the foregoing description that the tire carrying rim is demountably secured to the hub through the medium of the fastener elements comprising the bolts 26 and the nuts 28. In the present instance, the fastener elements, as well as the hub 11, are concealed by a cover plate 34 having the peripheral portions thereof fashioned to engage the section 18 of the wheel body radially outwardly beyond the nuts 28 of the fastener elements. As shown in Figure 3, the periphery of the cover 34 is secured to the wheel body section 18 of the member 14, by means of clips 35 concealed by the cover and having portions riveted or otherwise suitably secured to the front side of the section 18 between the fastener elements. The outer ends of the clips 35 are provided with forwardly extending spring fingers 36 fashioned to cooperate with portions 37 on the periphery of the cover to permit snapping the cover in place upon the wheel.

Referring now to the embodiment of the invention illustrated in Figures 4 and 5, it will be noted that the hub 11ᵃ is substantially the same in construction as the hub 11 previously described, in that the load supporting portion 12ᵃ comprises a plurality of radially outwardly extending spokes 15ᵃ identical in construction to the spokes 15 described in connection with the first embodiment of this invention. As distinguished from the modification illustrated in Figures 1 to 3 inclusive, the member 14ᵃ is of one-piece construction having an annular axially extending intermediate portion 40 permanently secured to the axially extending seats 17ᵃ upon the extremities of the spokes and having portions projecting outwardly from the extremities thereof. The rear outwardly extending portion of the member is designated in Figure 5 by the reference character 41 and cooperates with the load supporting portion 12ᵃ to form the web of a brake drum 42 differing from the brake drum 22, in that the brake flange 43 is formed integral with the outwardly extending portion 41 of the member and is provided with a lining 44 cast in the brake flange 43.

The front outwardly extending portion of the member constitutes a wheel body element and is designated in Figure 5 by the reference character 45, and is demountably secured to the tire carrying rim 13ᵃ, by means of the fastener elements 46. As shown in Figure 5, the wheel body element 45 is bowed axially outwardly adjacent the intermediate portion 40 to provide an annular substantially semi-circular bead 47 terminating at the outer end in a radially outwardly extending portion 48 apertured as at 49 to receive the bolts 50 of the fastener elements 46. The bolts 50 are permanently secured to the radial portion 48 and the shank portions thereof are adapted to extend through lugs 51 extending inwardly from the base of the tire carrying rim 13ᵃ and engageable with the front sides of the radial portions 48. The lugs 51 are concealed from view by an annular finishing ring 52 apertured opposite the shank portions of the bolts 50 and secured in place by means of the nuts 53 threaded upon the shank portions of the bolts. It will, of course, be apparent that the clamping nuts 53 function to perform the additional function of demountably securing the rim to the member 14ᵃ.

From the construction of the embodiment of the invention shown in Figures 4 and 5 previously described, it will be noted that the annular bead 47 renders the wheel body portion 45 flexible, to a certain extent, so as to permit the desired limited axial displacement of the rim 13ª relative to the hub upon the application of axial loads to the former. It will also be noted that inasmuch as the member 14ª is permanently secured to the hub 11ª, in the same manner as the member 14 is secured to the hub 11 in the first described form of the invention, it necessarily follows that stresses resulting from axial loads on the rim are transmitted to the hub 11ª, instead of to the brake drum 42.

In order to enhance the general appearance of the wheel and to render it unnecessary to finish the hub 11ª, I provide means for concealing the hub 11ª in the form of a cover having an inwardly directed peripheral portion 56 engaging the front side of the annular bead 47 and cooperating with flexible fingers 57 to provide for snapping the cover in place upon the wheel. In the present instance, the fingers 57 are interposed between the extremities of the spokes 15ª and the axial portion 40 of the member 14ª, so as to permit securing the same in place by the same rivets employed in permanently securing the member to the hub.

Referring now to the embodiment of the invention illustrated in Figures 6 to 8 inclusive, it will be noted that the member 14ᵇ comprises a brake drum element 60 permanently secured to the spokes 15ᵇ of the hub 11ᵇ and a wheel body element composed of a plurality of spokes 61 having the outer extremities thereof permanently secured to the base of the rim member 13ᵇ. The number of spokes 61 preferably corresponds to the number of spokes 15ᵇ on the hub 11ᵇ, and the spokes 61 are secured to the rim, in such a manner as to register with the spokes 15ᵇ when the wheel is assembled.

In detail, the element 60 of the member 14ᵇ comprises a radial portion 62 engaging the front sides of the spokes 15ᵇ and having a forwardly extending annular flange 63 at the inner edge thereof adapted to seat upon the axially extending shoulders 64 formed on the spokes 15ᵇ. The upper extremity of the radial portion 62 is provided with a rearwardly projecting annular portion 65 having the brake drum portion 66 formed integral therewith. As shown in Figure 7, the brake drum portion 66 comprises an annular brake flange 67 of the required diameter and having a liner 68 secured to the inner annular surface thereof.

As pointed out above, the section 60 is permanently secured to the spokes, and this is accomplished by means of the fastener elements 69 comprising bolts 70 having shank portions extending axially through suitable openings formed in the spokes 15ᵇ adjacent the extremities thereof, and having spaced enlargements thereon operable to permanently secure the section 60 of the member 14ᵇ to the spokes 15ᵇ.

The spokes 61 of the wheel body element are provided with radial portions 71 positioned at the front side of the radial portions 62 of the section 60 and terminating at the inner edges thereof in forwardly extending flanges 72 adapted to seat upon the annular portion 63 of the section 60. Upon referring to Figure 7, it will be noted that the radial portions 71 of the spokes 61 are apertured to provide for extending the threaded forward ends of the bolts 70 therethrough, and the spokes are demountably secured in place, by means of suitable nuts 73 threaded upon the forward extremities of the bolts. As is customary, the metal surrounding the openings through the radial portions of the spokes 61 is flared forwardly a sufficient distance to permit tensioning this metal by the nuts 73 and thereby provide for locking the latter from accidental disengagement.

Although the spokes 61 of the wheel body element are provided with forwardly extending flanges 75 at the opposite side edges thereof for reinforcing purposes, nevertheless, the spokes will flex a limited amount upon the application of axial loads on the rim 13ᵇ, so as to permit a slight displacement of the rim relative to the brake drum. It will also be apparent that the stresses resulting from axial loads applied to the rim 13ᵇ are transferred directly to the hub 11ᵇ through the fastener devices 69, and this is desirable in that it minimizes distortion of the brake drum by the wheel loads.

In the modification illustrated in Figures 6 to 8 inclusive, the entire wheel body, as well as the hub 11ᵇ, is concealed by means of a cover 76 having a peripheral portion 78 clamped against the front side of the rim 13ᵇ, by means of the spring fingers 79 secured to the rim by the same means for permanently securing the spokes 61 of the wheel body element to the rim. It will, of course, be understood from Figure 7 that while the spring fingers 79 operate to effectively secure the periphery of the cover 76 to the rim, nevertheless, the construction thereof is such as to provide for readily snapping the cover plate in assembled relation with the wheel.

Although several different types of constructions have been selected for the purpose of illustrating this invention, it will be noted that in each embodiment, the means connecting the rim member to the load supporting member or hub is sufficiently flexible to provide a limited axial displacement of the rim relative to the brake drum upon the application of axial loads to the rim. It will also be apparent that, although, in each construction shown herein, the brake drum and wheel body are secured together, nevertheless, the brake drum is relieved from the stresses resulting from wheel loads, since these stresses are transferred directly to the load carrying member of the hub. In addition, it is to be understood that various constructions, other than those specifically illustrated herein, may be provided to secure the foregoing advantageous results and, therefore, reservation is made to make such changes in the several embodiments of the invention illustrated, as may come within the purview of the accompanying claims.

What I claim as my invention is:

1. In a wheel, a rigid non-flexing load supporting member, an annular member substantially U-shaped in cross section encircling the load supporting member with the intermediate portion seated upon the outer end of the load supporting member and having the leg portion at the outboard side of the wheel extending beyond the load supporting member forming a shoulder, a brake flange extending axially from the leg portion of the U-shaped member at the inboard side of the wheel, a wheel body element at the outboard side of the first named leg of the U-shaped member having a portion seated upon the radial outer end of the latter leg portion and having another portion engaging the outboard side of the load supporting member adjacent the shoulder aforesaid, and means demountably securing the wheel body element to said first named leg between the portions aforesaid of the wheel body element.

2. In a wheel, a rigid load supporting member, a member having an annular portion encircling the load supporting member and secured to the latter, said member also having axially spaced radially outwardly projecting flanges, a brake flange carried by the inboard flange of said member, a wheel body member having a portion extending outwardly beyond the outboard flange and having another portion extending inwardly at the outboard side of the latter flange, means securing the inwardly extending portion of the wheel body member to the outboard flange, and a tire carrying rim mounted on the outwardly extending portion of said wheel body member.

3. In a wheel, a rigid load supporting member, a member having an annular portion encircling the load supporting member and secured to the latter, said member having radially outwardly extending axially spaced flanges positioned respectively on opposite sides of the securing means for the annular portion, a brake flange carried by the inboard flange of said member, a wheel body member having a portion seated on the periphery of the outboard flange and having a portion extending inwardly from the portion aforesaid over the outboard side of the outboard flange, means for securing the inwardly extending portion of the wheel body member to the outboard flange, and a tire carrying rim mounted on a portion of the wheel body member extending outwardly from the periphery of the outboard flange.

4. In a wheel, a rigid load supporting member, a member having an annular portion encircling the load supporting member and secured thereto, said member having radially outwardly extending axially spaced flanges positioned respectively on opposite sides of the securing means for said member, a brake flange carried by the inboard flange of the member, a wheel body element having a portion extending inwardly at the outboard side of the outboard flange and engageable with the load supporting member at the radially inner side of the annular portion of the second named member, and means for securing the inwardly extending portion of the wheel body member to the outboard flange of the second named member.

5. In a wheel, a rigid load supporting member, a member having an annular portion encircling the load supporting member and projecting axially beyond the latter member at the outboard side of the same to provide a shoulder, means securing the annular portion to the load supporting member, said member having radially outwardly extending axially spaced flanges positioned on opposite sides of the securing means, a brake flange carried by the inboard flange of the member, a wheel body element having a portion extending inwardly at the outboard side of the outboard flange and having an axial portion engageable with the load supporting member at the inner side of said shoulder, and means securing the inwardly extending portion of the wheel body member to the outboard flange.

CHARLES W. SINCLAIR.